United States Patent
Lauridsen et al.

(10) Patent No.: US 12,476,700 B2
(45) Date of Patent: Nov. 18, 2025

(54) COMMUNICATION IN NON-TERRESTRIAL NETWORKS

(71) Applicant: NOKIA TECHNOLOGIES OY, Espoo (FI)

(72) Inventors: Mads Lauridsen, Gistrup (DK); Jeroen Wigard, Klarup (DK); Rafhael Medeiros De Amorim, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 230 days.

(21) Appl. No.: 18/257,938

(22) PCT Filed: Dec. 1, 2021

(86) PCT No.: PCT/FI2021/050832
§ 371 (c)(1),
(2) Date: Jun. 16, 2023

(87) PCT Pub. No.: WO2022/129679
PCT Pub. Date: Jun. 23, 2022

(65) Prior Publication Data
US 2024/0007181 A1  Jan. 4, 2024

(30) Foreign Application Priority Data

Dec. 18, 2020 (FI) ..................... 20206337

(51) Int. Cl.
*H04B 7/185* (2006.01)
*H04B 17/309* (2015.01)
*H04B 17/40* (2015.01)

(52) U.S. Cl.
CPC ..... *H04B 7/18519* (2013.01); *H04B 7/18513* (2013.01); *H04B 17/309* (2015.01); *H04B 17/40* (2015.01)

(58) Field of Classification Search
None
See application file for complete search history.

(56) References Cited

U.S. PATENT DOCUMENTS 6,070,051 A     5/2000  Astrom et al.
2012/0133557 A1* 5/2012  Beaudin ............... H01Q 9/0435
                                                342/368

(Continued)

FOREIGN PATENT DOCUMENTS

WO  WO 2019/170866 A1  9/2019
WO  WO 2020/067826 A1  4/2020
WO  WO 2020/075044 A1  4/2020

OTHER PUBLICATIONS

"3rd Generation Partnership Project; Technical Specification Group Radio Access Network; NR; Radio Resource Control (RRC) protocol specification (Release 16)", 3GPP TS 38.331 v16.2.0, (Sep. 2020), 921 pages.

(Continued)

*Primary Examiner* — Ayaz R Sheikh
(74) *Attorney, Agent, or Firm* — ALSTON & BIRD LLP

(57) ABSTRACT

Apparatus and method for communication in non-terrestrial networks are provided. Downlink transmissions are received (400) from one or more non-terrestrial nodes. Signal strengths and/or signal quality of the transmissions are measured (402) from the one or more non-terrestrial nodes. Transitions between line-of-sight and non-line-of-sight states regarding the one or more non-terrestrial nodes are determined (404). Locations of the one or more non-terrestrial nodes and the apparatus are determined (406) and elevation and azimuth angles to the one or more non-terrestrial nodes from the apparatus are calculated (408). A database of the line-of-sight and non-line-of-sight states is generated (410) as a function of elevation and azimuth angles and apparatus location and utilised (412) to determine (Continued)

expected line-of-sight and non-line-of-sight states for non-terrestrial nodes.

20 Claims, 6 Drawing Sheets

(56) References Cited

U.S. PATENT DOCUMENTS

| | | | |
|---|---|---|---|
| 2015/0092746 A1 | 4/2015 | Jang et al. | |
| 2016/0249316 A1* | 8/2016 | Kudekar | G01S 5/0284 |
| 2019/0391273 A1 | 12/2019 | Eagling | |
| 2020/0301021 A1 | 9/2020 | Odd et al. | |
| 2020/0367067 A1 | 11/2020 | Haley et al. | |
| 2022/0095267 A1* | 3/2022 | Shafin | G01S 5/0218 |

OTHER PUBLICATIONS

"3rd Generation Partnership Project; Technical Specification Group Radio Access Network; Solutions for NR to support non-terrestrial networks (NTN) (Release 16)", 3GPP TR 38.821 v16.0.0, (Dec. 2019), 140 pages.

"3rd Generation Partnership Project; Technical Specification Group Radio Access Network; Study on New Radio (NR) to support non-terrestrial networks (Release 15)", 3GPP TR 38.811 v15.4.0, (Sep. 2020), 127 pages.

Ericsson, "PHY aspects of a moving RAN in non-terrestrial networks", 3GPP TSG-RAN WG1 Meeting #96, R1-1903217, (Feb. 25-Mar. 1, 2019), 3 pages.

Extended European Search Report for European Application No. 21905881.5 dated Apr. 9, 2024, 11 pages.

Holis et al., "Elevation Dependent Shadowing Model for Mobile Communications via High Altitude Platforms in Built-Up Areas", IEEE Transactions on Antennas and Propagation, vol. 56, No. 4, (Apr. 2008), 7 pages.

Hornillo-Mellado et al., "Prediction of Satellite Shadowing in Smart Cities with Application to IoT", Sensors 2020, 20, 475, (Jan. 14, 2020), 19 pages.

International Search Report and Written Opinion for Patent Cooperation Treaty Application No. PCT/FI2021/050832 dated Mar. 3, 2022, 15 pages.

Nokia Networks Oy, "Handover control and Adjacencies", Retrieved via the Internet on Aug. 30, 2024, <URL:https://www.academia.edu/9937987/Handover_Control_and_Adjacencieas_Handover_Control_and_Adjacencies_2_50_Nokia Networks_Oy>, (2004), 50 pages.

Office Action for Finland U.S. Appl. No. 20/206,337 dated Jan. 25, 2023, 7 pages.

Office Action for Finland U.S. Appl. No. 20/206,337 dated Jul. 30, 2021, 10 pages.

Rieche et al., "Land mobile satellite propagation characteristics from knife-edge diffraction modeling and hemispheric images," 2015 9th European Conference on Antennas and Propagation (EuCAP), (Apr. 2015), pp. 1-4.

Thales, "Solutions for NR to support non-terrestrial networks (NTN)", 3GPP TSG RAN meeting #86, RP-193234, (Dec. 9-13, 2019), 10 pages.

* cited by examiner

COMMUNICATION IN NON-TERRESTRIAL NETWORKS

CROSS-REFERENCE TO RELATED APPLICATIONS

This application is a national phase entry of International Application No. PCT/FI2021/050832, filed Dec. 1, 2021, which claims priority to Finnish Application No. 20206337, filed Dec. 18, 2020, the contents of which are hereby incorporated by reference in their entirety.

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development. In additional to traditional cellular communication, non-terrestrial networks may be utilised in communication especially where coverage of land-based access nodes is poor. Designing communication utilising both cellular and non-terrestrial networks is challenging due to different propagation environments.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus in a communication system comprising at least one processor; and at least one memory including computer program code, the at least one memory and computer program code configured to, with the at least one processor, cause the apparatus to: receive downlink transmissions from one or more non-terrestrial nodes; measure signal strengths and/or signal quality of the transmissions from the one or more non-terrestrial nodes; determine, based on the measurements, transitions between line-of-sight and non-line-of-sight states regarding the one or more non-terrestrial nodes; determine locations of the one or more non-terrestrial nodes and the apparatus; calculate elevation and azimuth angles to the one or more non-terrestrial nodes from the apparatus; generate a database of the line-of-sight and non-line-of-sight states as a function of elevation and azimuth angles and apparatus location, based on the measured signal strengths and determined transitions; utilise the database to determine expected line-of-sight and non-line-of-sight states for non-terrestrial nodes.

According to an aspect of the present invention, there is provided an apparatus in a communication system comprising: means for receiving downlink transmissions from one or more non-terrestrial nodes; means for measuring signal strengths and/or signal quality of the transmissions from the one or more non-terrestrial nodes; means for determining, based on the measurements, transitions between line-of-sight and non-line-of-sight states regarding the one or more non-terrestrial nodes; means for determining locations of the one or more non-terrestrial nodes and the apparatus; means for calculating elevation and azimuth angles to the one or more non-terrestrial nodes from the apparatus; means for generating a database of the line-of-sight and non-line-of-sight states as a function of elevation and azimuth angles and apparatus location, based on the measured signal strengths and determined transitions; means for utilising the database to determine expected line-of-sight and non-line-of-sight states for non-terrestrial nodes.

According to an aspect of the present invention, there is provided a method in an apparatus of a communication system, comprising: receiving downlink transmissions from one or more non-terrestrial nodes; measuring signal strengths and/or signal quality of the transmissions from the one or more non-terrestrial nodes; determining, based on the measurements, transitions between line-of-sight and non-line-of-sight states regarding the one or more non-terrestrial nodes; determining locations of the one or more non-terrestrial nodes and the apparatus; calculating elevation and azimuth angles to the one or more non-terrestrial nodes from the apparatus; generating a database of the line-of-sight and non-line-of-sight states as a function of elevation and azimuth angles and apparatus location, based on the measured signal strengths and determined transitions; utilising the database to determine expected line-of-sight and non-line-of-sight states for non-terrestrial nodes.

According to an aspect of the present invention, there is provided a computer program comprising instructions for causing an apparatus to perform at least the following: receive downlink transmissions from one or more non-terrestrial nodes; measure signal strengths and/or signal quality of the transmissions from the one or more non-terrestrial nodes; determine, based on the measurements, transitions between line-of-sight and non-line-of-sight states regarding the one or more non-terrestrial nodes; determine locations of the one or more non-terrestrial nodes and the apparatus; calculate elevation and azimuth angles to the one or more non-terrestrial nodes from the apparatus; generate a database of the line-of-sight and non-line-of-sight states as a function of elevation and azimuth angles and apparatus location, based on the measured signal strengths and determined transitions; utilise the database to determine expected line-of-sight and non-line-of-sight states for non-terrestrial nodes.

In an embodiment, the apparatus is configured to transmit to the communication system information on determined expected line-of-sight and non-line-of-sight states for non-terrestrial nodes.

In an embodiment, the apparatus is configured to determine expected line-of-sight and non-line-of-sight states related to a non-terrestrial node for the serving cell and/or one or more neighbouring or secondary cells based on the performed measurements in the azimuth-elevation angles, which the node is expected to move through relative to the apparatus location.

In an embodiment, the apparatus is configured to calculate elevation and azimuth angles of to a non-terrestrial node from the apparatus; determine from the database, based on the calculates angles and the location of the apparatus, expected line-of-sight and non-line-of-sight states.

In an embodiment, the apparatus is configured to store in the database for a given location and for given elevation and azimuth angle ranges an entry for estimated line-of-sight or non-line-of-sight state.

In an embodiment, the apparatus is configured to store in an entry a count of measured line-of-sight or non-line-of-sight state observations and determine reliability of the estimated line-of-sight or non-line-of-sight state based on the count.

In an embodiment, the apparatus is configured to provide an initial value for an entry based on values in neighboring entries.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIGS. 1 and 2 illustrate examples of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
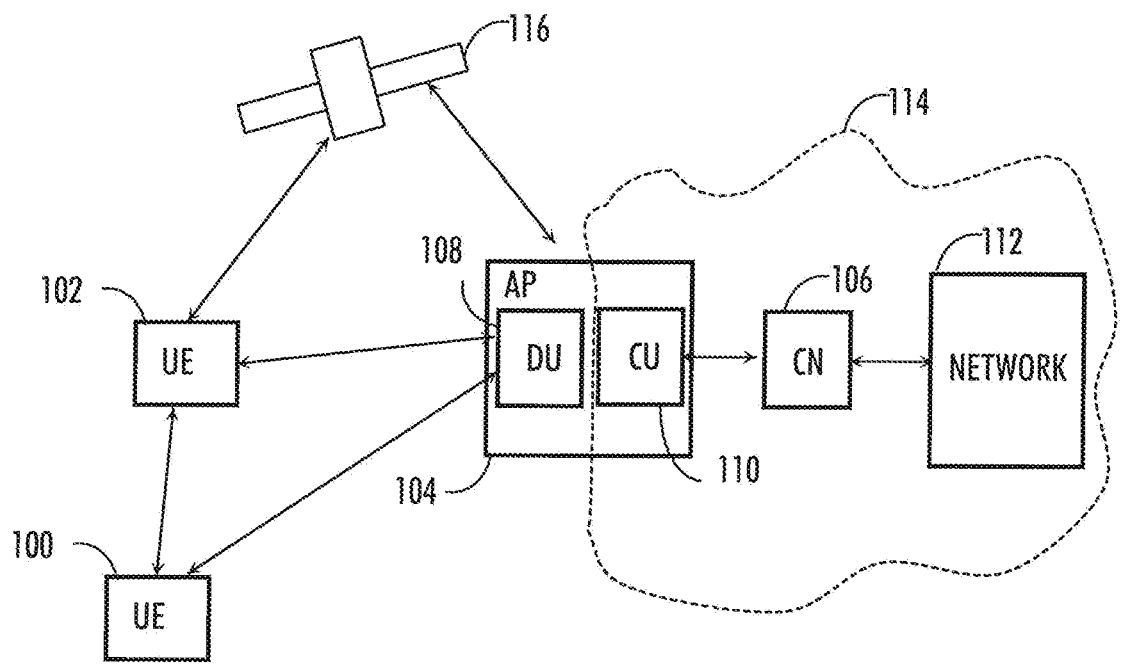

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability for critical communications, and future railway/ maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
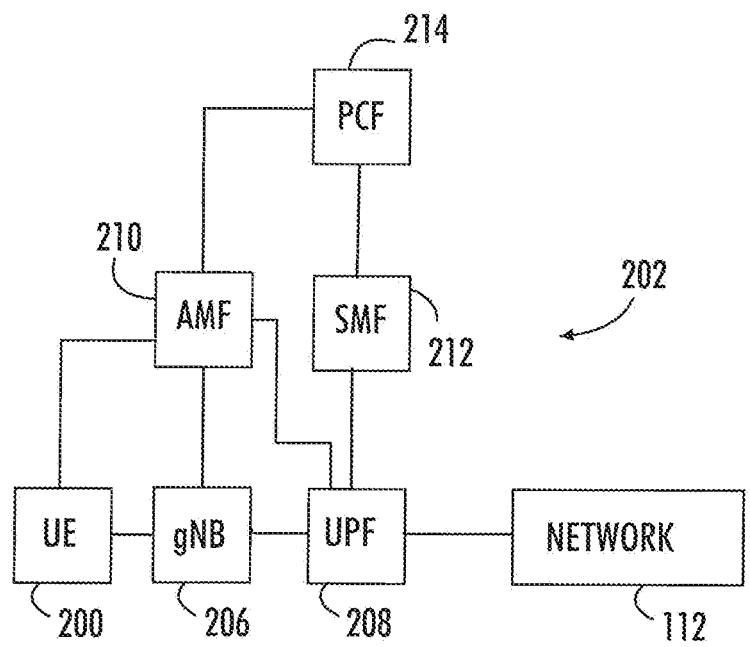

FIG. 2 illustrates an example of a communication system based on 5G network components. A user terminal or user equipment 200 communicating via a 5G network 202 with a data network 112. The user terminal 200 is connected to a Radio Access Network RAN node, such as (e/g)NodeB 206 which provides the user terminal with a connection to the network 112 via one or more User Plane Functions, UPF 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions.

As mentioned above, satellite communication has been proposed to enhance or complement terrestrial cellular communication system operation. Satellite communication is denoted as the use of non-terrestrial networks (NTN). Especially the use of low-earth orbit (LEO) satellites, operating in an altitude of approximately 500-1500 km, have been under study. At this height, the satellites move with a relative speed to Earth of about 7.5 km/s, which causes frequent mobility events and varying radio conditions even for stationary terminal devices.

The LEO satellites are each expected to provide coverage to a limited area on Earth. It has been estimated that a satellite may serve from a few tens of cells to several hundreds of cells. A typical cell size may be about 50 km but the cell size may extend to 1000 km as well. Due to the limited coverage area per satellite, the satellites are expected to form a constellation of orbits, where numerous satellites are located in each orbit. Some estimates propose using constellations with 40 to 75 satellites per orbit where the number of orbits is around 20 to 80 orbits.

High Altitude Platform Systems, HAPS, has also been proposed to enhance or complement terrestrial cellular communication system operation. In HAPS, a base station or a transceiver is located in a platform flying in the stratosphere. In the following, a term non-terrestrial node is used, meaning either a satellite node or a HAPS node.

The NTN deployment scenarios include both remote, rural areas and urban environments. In remote, rural areas, satellite communication may provide coverage where there is no terrestrial coverage. In urban areas, NTN could be also used for disaster relief services, for example. In both scenarios, there may be challenging radio propagation conditions in the sense that the direct radio path between the transmitter and receiver may be blocked, e.g. by foliage or buildings. A technical report of the 3GPP, TR 38.811 provides some estimates of line-of-sight (LOS) probability as a function of the radio environment and the elevation angle between satellite and a terminal device. Table 1 provides the LOS probability which at low elevation angles can be 25-40%, while it approaches 100% for the case where the satellite is directly above the terminal device (90 degrees elevation angle).

TABLE 1

(Table 6.6.1-1 of TR 38.811)

| Elevation | Dense urban scenario | Urban scenario | Suburban and Rural scenarios |
|---|---|---|---|
| 10° | 28.2% | 24.6% | 78.2% |
| 20° | 33.1% | 38.6% | 86.9% |
| 30° | 39.8% | 49.3% | 91.9% |
| 40° | 46.8% | 61.3% | 92.9% |
| 50° | 53.7% | 72.6% | 93.5% |
| 60° | 61.2% | 80.5% | 94.0% |
| 70° | 73.8% | 91.9% | 94.9% |
| 80° | 82.0% | 96.8% | 95.2% |
| 90° | 98.1% | 99.2% | 99.8% |

Signal strength, shadow fading, clutter loss, and fast fading parameters may all depend on the elevation angle, carrier frequency, propagation scenario and LOS/non-LOS (NLOS) state. Thus, it is evident that propagation conditions in NLOS are significantly worse than in LOS.

Figure 3:
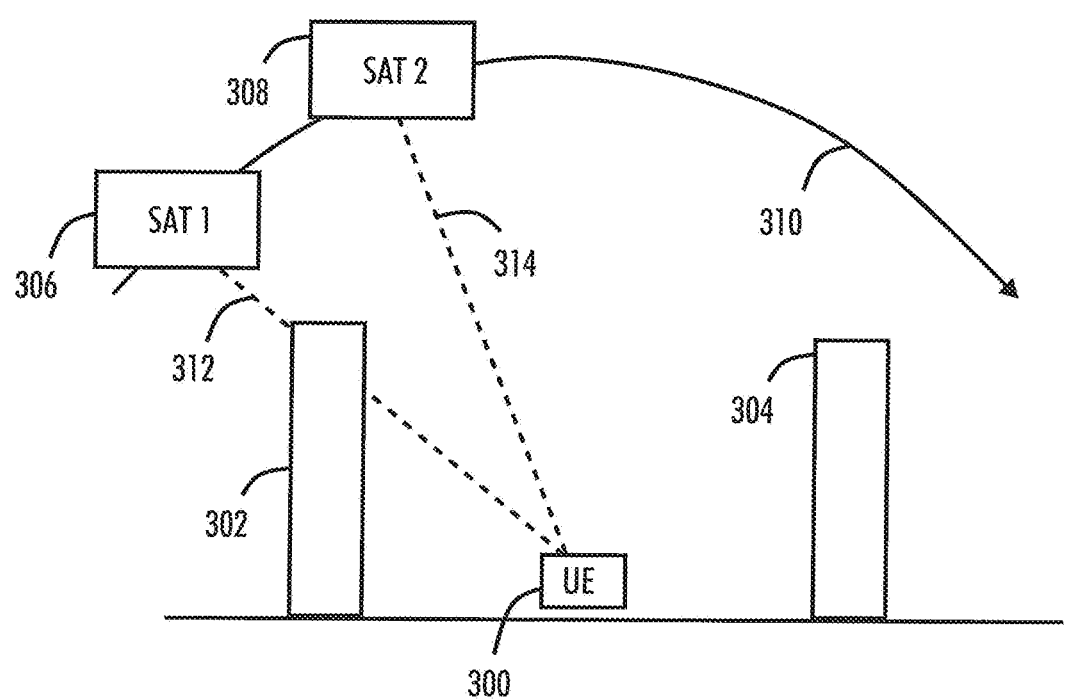
FIG. 3 illustrates a terminal device in an environment.

FIG. 3 illustrates a situation, where a terminal device 300 is located in an environment with tall objects 302, 304 such as buildings, for example.

In the example of FIG. 3, there are two non-terrestrial nodes 306, 308 travelling on the same orbit 310. In the example situation, the terminal device 300 is in NLOS situation 312 with node 306 and in LOS situation 314 with node 308. A stationary terminal device may be subject to periodic LOS and NLOS radio channels caused by non-terrestrial nodes in the same orbit passing over the device UE. The path gain difference between NLOS and LOS connections may be 20 dB, for example, and this may severely impact the performance especially because NTN is already operating with a challenging link budget. For example, a sudden drop in signal power will impact scheduling mobility decisions.

The change from LOS situation to NLOS may be quite abrupt. Thus, propagation conditions in NTN may change quickly and gNodeB may have to react accordingly. To be able to inform gNodeB about changing conditions, the terminal should be able to reliable detect the changes in the conditions.

Figure 4:
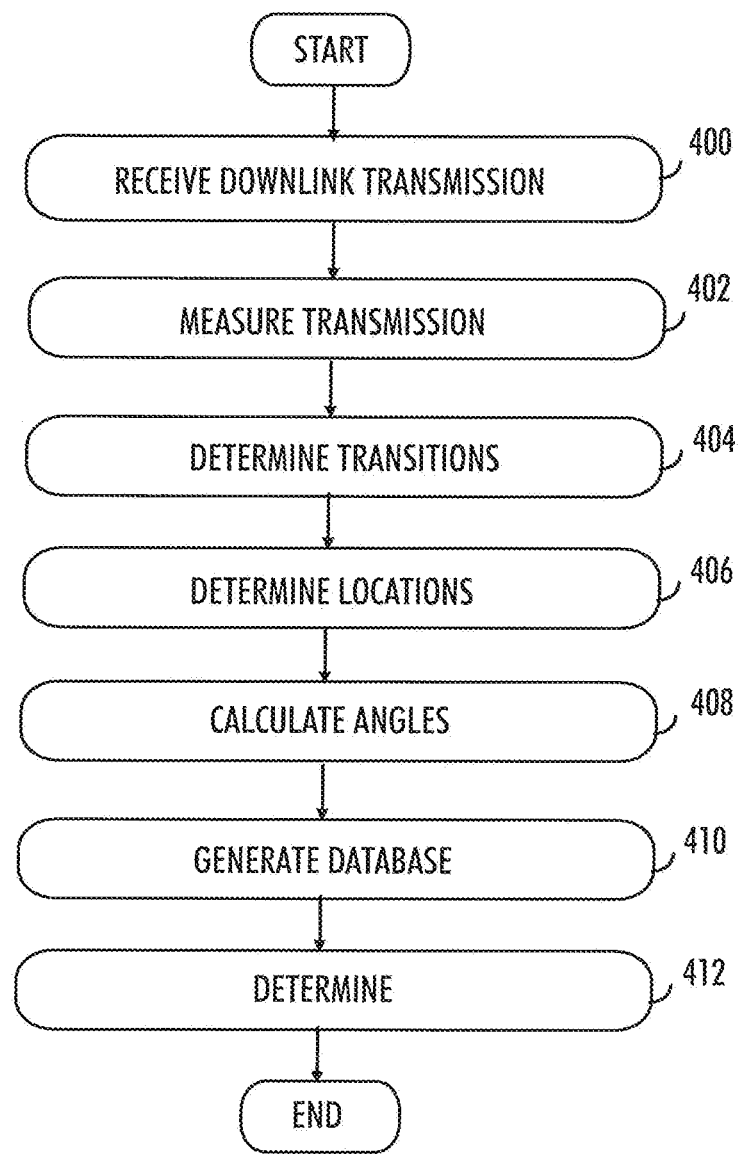
FIGS. 4 and 5 are flowcharts illustrating embodiments.

The flowchart of FIG. 4 illustrates an embodiment. The flowchart illustrates an example of the operation of an apparatus. In an embodiment, the apparatus may be a terminal device, user equipment, a part of a terminal device or any other apparatus capable of executing following steps.

In step 400, the apparatus is configured to receive downlink transmissions from one or more non-terrestrial nodes.

In step 402, the apparatus is configured to measure signal strengths and/or signal quality of the transmissions from the one or more non-terrestrial nodes. In an embodiment, the measurements may be Reference Signal Received Power, RSRP, and/or Reference Signal Received Quality, RSRQ measurements, for example.

In step 404, the apparatus is configured to determine, based on the measurements, transitions between line-of-sight and non-line-of-sight states regarding the one or more non-terrestrial nodes.

In an embodiment, the NLOS/LOS states may be determined utilising a time window, which may be given by the communication system or network, and power differences in the received signals. For example, a so called Enhanced Rapid Field Drop method may be utilised. It is based on using raw samples to quickly detect rapid drops in the received power. Furthermore, the feature is enhanced with a window and a threshold, comparing the current received power value with the value at the start of the window.

In an embodiment, the apparatus may receive from the communication system thresholds for RSRP and/or RSRQ to determine, based on the measurements, a transition from a state to another.

In step 406, the apparatus is configured to determine locations of the one or more non-terrestrial nodes and the apparatus. In an embodiment, the non-terrestrial node location may be determined through ephemeris data of the non-terrestrial node. In an embodiment, the apparatus may determine its location utilising Global Navigation Satellite System, GNSS.

In step 408, the apparatus is configured to calculate elevation and azimuth angles to the one or more non-terrestrial nodes from the apparatus.

Azimuth and elevation angles may be measured to determine the position of a non-terrestrial node. In an embodiment, non-terrestrial node position/ephemeris may be used to calculate the angles. Azimuth angle indicates the horizontal direction to face and elevation angle denoted the vertical angle up to the sky. For azimuth angles, North is at 0°. An angle increase in a clockwise direction. For elevation angles, a satellite at horizon would be at 0° and a satellite directly above is at 90° (the zenith).

In an embodiment, the apparatus may have a counter to determine how many times the LOS/NLOS state has been observed for the current elevation and azimuth angles (or a range of angles) at the current location.

In an embodiment, the apparatus estimates the angles through its antennas (in case of directional antennas) instead of calculating them.

In step 410, the apparatus is configured to generate a database of the line-of-sight and non-line-of-sight states as a function of elevation and azimuth angles and apparatus location, based on the measured signal strengths and determined transitions. In an embodiment, the database may be in the form of a matrix as illustrated further below.

In step 412, the apparatus is configured to utilise the database to determine expected line-of-sight and non-line-of-sight states for non-terrestrial nodes.

In an embodiment, the apparatus is configured to transmit to the communication system information on determined expected line-of-sight and non-line-of-sight states for non-terrestrial nodes.

In an embodiment, the apparatus may be configured to determine expected line-of-sight and non-line-of-sight states for the serving cell and/or one or more neighbouring or secondary cells. In such situations, the terminal device may include in the transmission of step 412 information on which cell the message relates to. The cell may be identified with a Physical Cell ID, for example. In an embodiment, the apparatus is configured to determine the expected durations of the expected line-of-sight and non-line-of-sight states.

In an embodiment, the apparatus is configured to transmit to the communication system the database or a part of the database.

In an embodiment, the apparatus may receive a request from the communication system regarding expected line-of-sight and non-line-of-sight states of a region. The apparatus may respond to the request by transmitting the requested information.

The proposed solution can be applied when the terminal device is RRC Connected or in RRC Idle/Inactive mode.

The proposed solution enables indicating to network about incoming changes, base station is able to react to the situation beforehand. The proposed solution further enables better quality and less radio link failures. The network is able to apply this also to the other terminal devices which are close to the terminal device performing the proposed solution.

Figure 5:
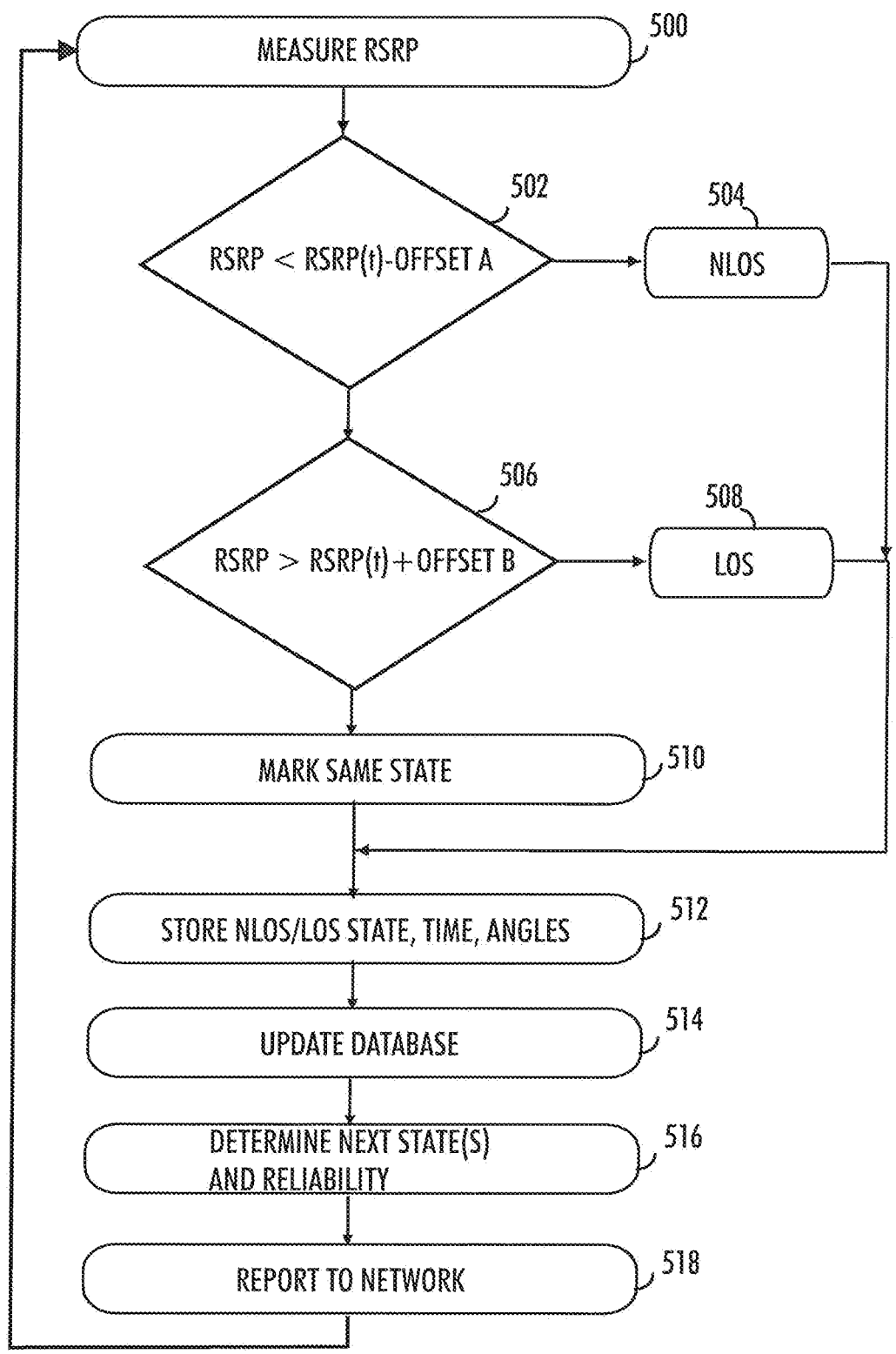

The flowchart of FIG. 5 illustrates an embodiment. The flowchart illustrates an example of the operation of an apparatus. In an embodiment, the apparatus may be a terminal device, user equipment, a part of a terminal device or any other apparatus capable of executing following steps.

In step 500, the apparatus is configured to measure RSRP of a non-terrestrial node transmission.

In the determination of NLOS/LOS state, a time window may be used as mentioned above. The window time t may be given by the network as possible offsets.

In step 502, the apparatus is configured to check whether the measured RSRP is smaller than an RSRP value at given time t. An offset may be applied in the comparison. If the measured RSRP is smaller, it may be determined that there is a NLOS situation 504.

In step 506, if there was no NLOS situation, the apparatus is configured to check whether the measured RSRP is greater than an RSRP value at given time t. Again, an offset may be applied in the comparison. If the measured RSRP is greater, it may be determined that there is a LOS situation 508. In an embodiment, the offsets may be parameters given by the network.

If a transition from NLOS to LOS or vice versa is not detected, the apparatus is configured to mark the same state as in the previous measurement 510.

The apparatus is configured in step 512 to determine azimuth and elevation angles and log NLOS/LOS state, time and the angles.

In an embodiment, the apparatus maintains a database that comprises for a given location and for given elevation and azimuth angle ranges an entry for expected line-of-sight or non-line-of-sight state. In an embodiment, the apparatus is configured to store in an entry a count of measured line-of-sight or non-line-of-sight state observations In step 514, the apparatus is configured to update the entry in the database or matrix regarding the detected state and increase the count.

In step 516, the apparatus is configured to determine next states and their reliability using the database or matrix.

In step 518, the apparatus is configured to transmit a report to the network.

In an embodiment, a terminal device may adapt a window time t of the measurement period, based on the non-terrestrial node ephemeris data, such as number of nodes per orbit, altitude, and also the deployment scenario, some of which are illustrated in Table 1, which indicates different LOS probabilities for different scenarios. In an embodiment, the measurements could be more frequent in a dense urban scenario.

In an embodiment, the terminal device may be configured to delay the reporting of the LOS/NLOS observations until a (handover) measurement report is triggered. Furthermore, the terminal device may be configured to determine how long the measurements are stored (minutes, hours) based on the non-terrestrial node constellation. In an embodiment, the network may ask the terminal device to provide measurements of past observations. In that case it may be beneficial to complement the database with a list of Physical layer Cell Identifier, PCIs, for example per observation and location of measurement.

In an embodiment, the terminal device may be configured to determine when to recalculate the database based on the movement of the terminal device. Alternatively, this can also be configured by the network. In an embodiment, the terminal device may keep the past observations and then update with new measurements, but not do reliability estimates until a given state has been measured at least once in the new location. In addition to movement to a new location, the terminal device may also account for rotation of the terminal device.

The terminal device measurements and the LOS/NLOS state observations are closely linked to the location of the terminal device and the surrounding environment. Thus depending on shadowing/blocking structures in the environment the database may be valid for a certain area (such as a circle of radius of given length) and thus even if the terminal device detects it has moved it could reuse the current matrix as a starting point and evaluate whether the observations are still valid.

In an embodiment, the terminal device may utilise accelerometer and/or gyroscope to detect movement and a potential need for updating of the database.

In an embodiment, the terminal device may be configured to store more than one database, for example one database per determined area or location. This may be advantageous especially when the terminal device determines that it is located in a highly variable environment (in terms of LOS/NLOS). In an embodiment, the databases not currently in use may be compressed to save memory space. In an embodiment, a validity timer may be applied to discard a stored database after a given time, for example after 24 hours if it has not been used or updated.

Figure 6:
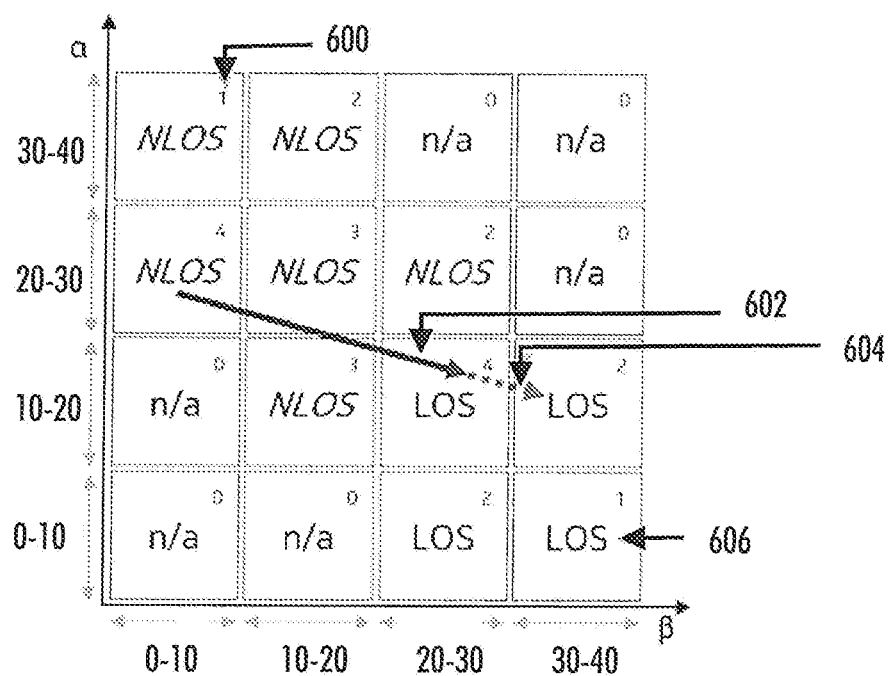
FIGS. 6 and 7 illustrate example of databases as matrices.

FIG. 6 illustrates an example of the use of the database maintained by a terminal device, in the determination of next LOS/NLOS states and their reliability. FIG. 6 illustrates the database as a LOS/NLOS matrix for a given location/area. In an embodiment, the size of the area can be configured based on the type of the area, for example based on typical sizes of shadowing objects. In this example, on x-axis is elevation angles and on y-axis azimuth angles, as ranges having the length of 10 degrees. The selected range length may be a system parameter. The matrix comprises an entry per range.

Each entry comprises either a NLOS or LOS marking, denoting that an observation of NLOS or LOS connection has been detected. Those entries that have not yet any observations are denoted as "n/a".

In an embodiment, each entry contains a count of observations that have been obtained for the ranges in question. For example, the entry $\alpha,\beta=\{[30\text{-}40],[0\text{-}10]\}$, has a count 600 having a value of 1. The neighbouring entry $\alpha,\beta=\{[20\text{-}30],[0\text{-}10]\}$, has a count having a value of 4. Thus, the square in $\alpha,\beta=\{[20\text{-}30],[0\text{-}10]\}$ has been observed to be NLOS 4 times.

In an embodiment, if an opposite state (LOS) would be observed the counter would be reset to 1 and the opposite state is marked in that entry.

In an embodiment, averaging may be utilised with thresholds to determine LOS/NLOS. For example, if there are four LOS and one NLOS observations, the average would be 4/5 and if a threshold of 0.6 is used, then as 0.75>0.6 the state would be LOS.

FIG. 6 illustrates a movement vector 602 that defines relative movement of a satellite node as observed by the terminal device. Based on terminal device location, non-terrestrial node ephemeris, and/or extension of the current non-terrestrial node movement vector estimate, the terminal device can also predict what entry 604 in the matrix will be the next valid one.

In an embodiment, if the next determined valid entry does not comprise any observations, i.e. it is the first time the terminal device is in the current location and the non-terrestrial node is at the designated angles in relation to the terminal device, the terminal device may be configured to estimate the state for the entry. In an embodiment, the estimation may be based on a weighted measure of the states of neighbouring entries. Alternatively, only those neighbouring entries that are covered by the same movement vector are utilised in the estimation. The count value in the neighbouring entries may be utilised in the estimation to increase the reliability. For example, if the state of the entry 604 $\alpha,\beta=\{[10\text{-}20],[30\text{-}40]\}$ was not yet determined, the terminal device could count 7×LOS (7×1) and 2×NLOS (2×0) at the neighbours, obtaining an average of 7/9=0.78 and thus LOS is expected.

In an embodiment, when estimating a state based on neighbouring values, there may be a limit on the maximum number of neighbours having a state denoted as "n/a", and also the min/max value to determine LOS/NLOS, e.g. 0.75/0.25.

In an embodiment, if a state for the next determined valid entry has previously been determined, the terminal device may estimate the reliability based on the number of counts. For example, entry 604 $\alpha,\beta=\{[10\text{-}20],[20\text{-}30]\}$ having a count with value 4 is reliable and can be reported, while entry 606 $\alpha,\beta=\{[0\text{-}10],[30\text{-}40]\}$ having a count with value 1 is not yet reliable and should not be reported.

In an embodiment, similarly to the state estimation based on neighbours, the reliability can also be complemented with an estimate of the state taking into account the states & counts of neighbouring entries. The previous example resulted in an average of 0.78 and since $\alpha,\beta=\{[10\text{-}20],[30\text{-}40]\}$(the entry, whose neighbours have an average of 0.78) is counted twice, the estimate can be deemed reliable because both the neighbours and the count of the present entry are significantly higher than 0.5 and 0, respectively.

Figure 7:
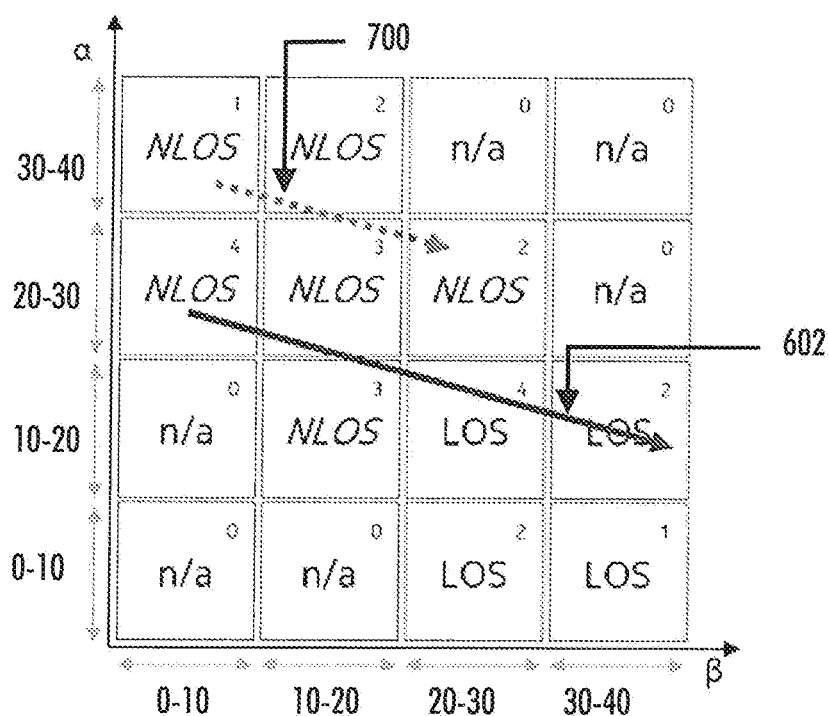

As Earth rotates, the non-terrestrial nodes will not be following the same elevation and azimuth angles on every overflight of the terminal device. Thus, due to the Earth rotation the route 602 valid in the matrix of FIG. 6 may be shifted when the non-terrestrial node later on passes over the terminal device. Thus, the terminal device will have to switch to a different set of estimates as indicated in FIG. 7. In FIG. 7 the route of the non-terrestrial node in a previous over flight is denoted as 602 and the new shifted route of a later overflight is denoted as 700. The switch to a new movement vector 700 can be based on satellite ephemeris and terminal device location. Alternatively, the terminal device can employ a moving average filter to make sure past observations are not relying on too old measurements.

In an embodiment, when the terminal device is powering ON for the first time or has moved to a new location, sufficiently far from previous location, the terminal device is configured determine that the database is not valid. Thus, the terminal device is configured to start with an empty LOS/NLOS database or matrix. To facilitate a fast population of an empty matrix, the terminal device may, in an embodiment, deduct states based on the initial observations. For example, if the terminal device has detected a change from LOS to NLOS when the elevation angle is reduced from 50 to 40 degrees, it may be configured to determine that the following lower angles (30-0 degrees) are also NLOS. Estimates derived in this manner without actual observations are likely less reliable than values obtained from real observations or actual measurements and therefore the terminal device will not apply a count value, or utilise a fractional count such as ¼, ½, for example, instead of integer counting.

In a similar manner, if the terminal device suddenly detects a LOS non-terrestrial node at 40 degrees and also at 50 degrees, it can initially assume that lower elevation angles (30-0 degrees) to the non-terrestrial node are NLOS.

In an embodiment, the terminal device may also attempt to reuse the matrix from the previous location (depending on how far the terminal device moved). To determine whether the old matrix is valid at the new location the terminal device may be configured to compare a given number of first observations with corresponding entries in the old matrix. If there is a match the terminal device can continue using the old matrix, while if the new observations and old entries differ, the terminal device will need to build a new matrix of observations.

Figure 8:
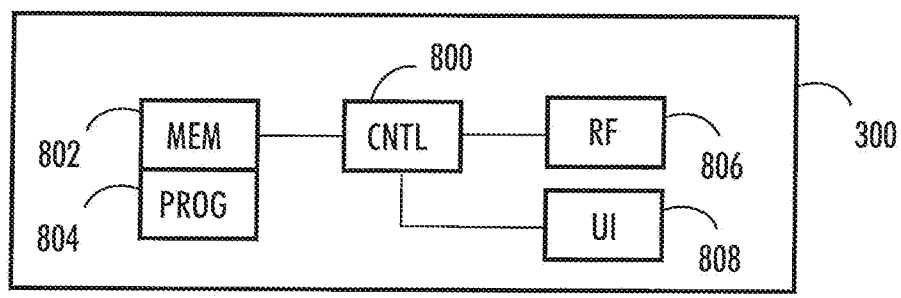
FIG. 8 illustrates an example of an apparatus.

FIG. 8 illustrates an embodiment. The figure illustrates a simplified example of an apparatus applying embodiments of the invention. In some embodiments, the apparatus may be a terminal device 300, or a part of a terminal device.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 300 of the example includes a control circuitry 800 configured to control at least part of the operation of the apparatus.

The apparatus may comprise a memory 802 for storing data. Furthermore, the memory may store software 804 executable by the control circuitry 800. The memory may be integrated in the control circuitry.

The apparatus may comprise one or more interface circuitries 806, 808. The interface circuitries are operationally connected to the control circuitry 800. An interface circuitry 806 may be a set of transceivers configured to communicate with a RAN node, such as an (e/g)NodeB of a wireless communication network or a satellite node. The interface circuitry may be connected to an antenna arrangement (not shown). The apparatus may also comprise a connection to a transmitter instead of a transceiver. The apparatus may further comprise a user interface 808.

In an embodiment, the software 804 may comprise a computer program comprising program code means adapted to cause the control circuitry 800 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute at least the following receive downlink transmissions from one or more non-terrestrial nodes; measure signal strengths and/or signal quality of the transmissions from the one or more non-terrestrial nodes; determine, based on the measurements, transitions between line-of-sight and non-line-of-sight states regarding the one or more non-terrestrial nodes; determine locations of the one or more non-terrestrial nodes and the apparatus; calculate elevation and azimuth angles to the one or more non-terrestrial nodes from the apparatus; generate a database of the line-of-sight and non-line-of-sight states as a function of elevation and azimuth angles and apparatus location, based on the measured signal strengths and determined transitions; utilise the database to determine expected line-of-sight and non-line-of-sight states for non-terrestrial nodes.

An embodiment provides a non-transitory computer readable medium comprising program instructions for causing an apparatus to perform at least the following: receive downlink transmissions from one or more non-terrestrial nodes; measure signal strengths and/or signal quality of the transmissions from the one or more non-terrestrial nodes; determine, based on the measurements, transitions between line-of-sight and non-line-of-sight states regarding the one or more non-terrestrial nodes; determine locations of the one or more non-terrestrial nodes and the apparatus; calculate elevation and azimuth angles to the one or more non-terrestrial nodes from the apparatus; generate a database of the line-of-sight and non-line-of-sight states as a function of elevation and azimuth angles and apparatus location, based on the measured signal strengths and determined transitions; utilise the database to determine expected line-of-sight and non-line-of-sight states for non-terrestrial nodes.

An embodiment provides a computer readable medium comprising program instructions for causing an apparatus to perform at least the following: receive downlink transmissions from one or more non-terrestrial nodes; measure signal strengths and/or signal quality of the transmissions from the one or more non-terrestrial nodes; determine, based on the measurements, transitions between line-of-sight and non-line-of-sight states regarding the one or more non-terrestrial nodes; determine locations of the one or more non-terrestrial nodes and the apparatus; calculate elevation and azimuth angles to the one or more non-terrestrial nodes from the apparatus; generate a database of the line-of-sight and non-line-of-sight states as a function of elevation and azimuth angles and apparatus location, based on the measured signal strengths and determined transitions; utilise the database to determine expected line-of-sight and non-line-of-sight states for non-terrestrial nodes.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for a communication system comprising at least one processor; and at least one memory storing instructions that, when executed by the at least one processor, cause the apparatus to:
   receive downlink transmissions from one or more non-terrestrial nodes;
   measure at least one of the following: signal strengths or signal quality of the transmissions from the one or more non-terrestrial nodes;
   determine, based on the measurements, transitions between line-of-sight and non-line-of-sight states regarding the one or more non-terrestrial nodes;
   determine locations of the one or more non-terrestrial nodes and the apparatus;
   calculate elevation and azimuth angles to the one or more non-terrestrial nodes from the apparatus;
   generate a database of the line-of-sight and non-line-of-sight states as a function of elevation and azimuth angles and apparatus location, based on the measured signal strengths and determined transitions; and
   utilise the database to determine expected line-of-sight and non-line-of-sight states for non-terrestrial nodes.

2. The apparatus of claim 1, the at least one memory storing instructions that, when executed by the at least one processor, cause the apparatus further to:
   transmit to the communication system information on determined expected line-of-sight and non-line-of-sight states for non-terrestrial nodes.

3. The apparatus of claim 1, the at least one memory storing instructions that, when executed by the at least one processor, cause the apparatus further to:
   determine expected line-of-sight and non-line-of-sight states related to a non-terrestrial node for at least one of the following: the serving cell or one or more neighbouring or secondary cells based on the performed measurements in the azimuth-elevation angles, which the node is expected to move through relative to the apparatus location.

4. The apparatus of claim 1, the at least one memory storing instructions that, when executed by the at least one processor, cause the apparatus further to:
   calculate elevation and azimuth angles to a non-terrestrial node from the apparatus; and
   determine from the database, based on the calculated angles and the location of the apparatus, expected line-of-sight and non-line-of-sight states.

5. The apparatus of claim 1, wherein the at least one memory storing instructions that, when executed by the at least one processor, cause the apparatus further to:
   store in the database for a given location and for given elevation and azimuth angle ranges an entry for estimated line-of-sight or non-line-of-sight state.

6. The apparatus of claim 5, wherein the at least one memory storing instructions that, when executed by the at least one processor, cause the apparatus further to:
   store in an entry a count of measured line-of-sight or non-line-of-sight state observations; and determine reliability of the estimated line-of-sight or non-line-of-sight state based on the count.

7. The apparatus of claim 5, wherein the at least one memory storing instructions that, when executed by the at least one processor, cause the apparatus further to:
provide an initial value for an entry based on values in neighboring entries.

8. The apparatus of claim 1, wherein the non-terrestrial node is either a satellite node or a High Altitude Platform Systems node.

9. A method in an apparatus for a communication system, comprising:
receiving downlink transmissions from one or more non-terrestrial nodes;
measuring at least one of the following: signal strengths or signal quality of the transmissions from the one or more non-terrestrial nodes;
determining, based on the measurements, transitions between line-of-sight and non-line-of-sight states regarding the one or more non-terrestrial nodes;
determining locations of the one or more non-terrestrial nodes and the apparatus;
calculating elevation and azimuth angles to the one or more non-terrestrial nodes from the apparatus;
generating a database of the line-of-sight and non-line-of-sight states as a function of elevation and azimuth angles and apparatus location, based on the measured signal strengths and determined transitions; and
utilising the database to determine expected line-of-sight and non-line-of-sight states for non-terrestrial nodes.

10. The method of claim 9, further comprising:
transmitting to the communication system information on determined expected line-of-sight and non-line-of-sight states for non-terrestrial nodes.

11. The method of claim 9, further comprising:
storing in the database for a given location and for given elevation and azimuth angle ranges an entry for estimated line-of-sight or non-line-of-sight state.

12. The method of claim 11, further comprising:
storing in an entry a count of measured line-of-sight or non-line-of-sight state observations, and
determining reliability of the estimated line-of-sight or non-line-of-sight state based on the count.

13. The method of claim 11, further comprising:
providing an initial value for an entry based on values in neighboring entries.

14. The method of claim 9, further comprising:
determine expected line-of-sight and non-line-of-sight states related to a non-terrestrial node for at least one of the following: the serving cell or one or more neighbouring or secondary cells based on the performed measurements in the azimuth-elevation angles, which the node is expected to move through relative to the apparatus location.

15. The method of claim 9, wherein the non-terrestrial node is either a satellite node or a High Altitude Platform Systems node.

16. A non-transitory computer readable medium comprising program instructions that, when executed by an apparatus, cause the apparatus to perform at least the following:
receive downlink transmissions from one or more non-terrestrial nodes;
measure at least one of the following: signal strengths or signal quality of the transmissions from the one or more non-terrestrial nodes;
determine, based on the measurements, transitions between line-of-sight and non-line-of-sight states regarding the one or more non-terrestrial nodes;
determine locations of the one or more non-terrestrial nodes and the apparatus;
calculate elevation and azimuth angles to the one or more non-terrestrial nodes from the apparatus;
generate a database of the line-of-sight and non-line-of-sight states as a function of elevation and azimuth angles and apparatus location, based on the measured signal strengths and determined transitions; and
utilise the database to determine expected line-of-sight and non-line-of-sight states for non-terrestrial nodes.

17. The method of claim 9, the method further comprising:
calculating elevation and azimuth angles to a non-terrestrial node from the apparatus; and
determining from the database, based on the calculated angles and the location of the apparatus, expected line-of-sight and non-line-of-sight states.

18. The non-transitory computer readable medium of claim 16, further comprising:
transmitting to the communication system information on determined expected line-of-sight and non-line-of-sight states for non-terrestrial nodes.

19. The non-transitory computer readable medium of claim 16, further comprising:
storing in the database for a given location and for given elevation and azimuth angle ranges an entry for estimated line-of-sight or non-line-of-sight state.

20. The non-transitory computer readable medium of claim 19 further comprising:
storing in an entry a count of measured line-of-sight or non-line-of-sight state observations, and
determining reliability of the estimated line-of-sight or non-line-of-sight state based on the count.

* * * * *